(12) United States Patent
Gupta et al.

(10) Patent No.: US 6,571,243 B2
(45) Date of Patent: May 27, 2003

(54) METHOD AND APPARATUS FOR CREATING EXTRACTORS, FIELD INFORMATION OBJECTS AND INHERITANCE HIERARCHIES IN A FRAMEWORK FOR RETRIEVING SEMISTRUCTURED INFORMATION

(75) Inventors: Ashish Gupta, Seattle, WA (US); Peter Norvig, Palo Alto, CA (US); Anand Rajaraman, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 10/000,743

(22) Filed: Nov. 30, 2001

(65) Prior Publication Data

US 2002/0062312 A1 May 23, 2002

Related U.S. Application Data

(63) Continuation of application No. 09/196,421, filed on Nov. 19, 1998, now abandoned.
(60) Provisional application No. 60/066,125, filed on Nov. 21, 1997.

(51) Int. Cl.[7] .............................................. G06F 17/30
(52) U.S. Cl. ........................ 707/6; 707/1; 707/2; 707/3; 707/4; 707/5; 707/100
(58) Field of Search ................................. 707/1–6, 100

(56) References Cited

U.S. PATENT DOCUMENTS

| 4,631,673 A | 12/1986 | Haas et al. |
| 4,917,588 A | 4/1990 | Grabener et al. |
| 4,918,593 A | 4/1990 | Huber |
| 5,307,484 A | 4/1994 | Baker et al. |
| 5,386,556 A | 1/1995 | Hedin et al. |
| 5,457,792 A | 10/1995 | Virgil et al. |
| 5,544,355 A | 8/1996 | Chaudhuri et al. |
| 5,649,186 A | 7/1997 | Ferguson |
| 5,659,729 A | 8/1997 | Nielsen |
| 5,692,181 A | 11/1997 | Anand et al. |
| 5,706,501 A | 1/1998 | Horikiri et al. |

(List continued on next page.)

OTHER PUBLICATIONS

Date, C.J. (1986). "An Introduction to Database Systems, vol. I, Fourth Edition," Reading:Addison–Wesley, QA76.9.D3D37, 132–136.

(List continued on next page.)

*Primary Examiner*—Greta Robinson
*Assistant Examiner*—Debbie M. Le
(74) *Attorney, Agent, or Firm*—Townsend and Townsend and Crew LLP

(57) ABSTRACT

According to the invention, a system and method for extracting information from a semistructured information source. The system includes a listing stack for holding extracted information. A means for matching at least one extractor to the semistructured information to return a list of potential matches is also included. The system can also include a means for iterating through the list of potential matches and a means for retrieving information from a particular match in the list of potential matches. A means for adding a particular match into the listing stack can also be part of the system.

30 Claims, 9 Drawing Sheets

U.S. PATENT DOCUMENTS

| | | | |
|---|---|---|---|
| 5,706,507 | A | | 1/1998 Schloss |
| 5,708,806 | A | | 1/1998 DeRose et al. |
| 5,708,825 | A | | 1/1998 Sotomayor |
| 5,721,851 | A | | 2/1998 Cline et al. |
| 5,721,903 | A | | 2/1998 Anand et al. |
| 5,737,592 | A | | 4/1998 Nguyen et al. |
| 5,748,954 | A | | 5/1998 Mauldin |
| 5,761,663 | A | | 6/1998 Lagarde et al. |
| 5,806,066 | A | | 9/1998 Golshani et al. |
| 5,826,258 | A | | 10/1998 Gupta et al. |
| 5,864,848 | A | * | 1/1999 Horvitz et al. ............... 707/102 |
| 5,870,739 | A | | 2/1999 Davis, III et al. |
| 5,873,079 | A | | 2/1999 Davis, III et al. |
| 5,884,304 | A | | 3/1999 Davis, III et al. |
| 5,890,147 | A | | 3/1999 Peltonen et al. |
| 5,903,893 | A | | 5/1999 Kleewein et al. |
| 5,913,214 | A | * | 6/1999 Madnick et al. ............... 707/10 |
| 5,926,652 | A | | 7/1999 Reznak |
| 5,943,665 | A | | 8/1999 Guha |
| 5,956,720 | A | * | 9/1999 Fernandez et al. ............. 707/1 |
| 5,963,949 | A | | 10/1999 Gupta et al. |
| 5,991,756 | A | | 11/1999 Wu |
| 6,009,410 | A | * | 12/1999 LeMole et al. ................. 705/1 |
| 6,029,182 | A | * | 2/2000 Nehab et al. ............ 707/501.1 |
| 6,085,190 | A | | 7/2000 Sakata |
| 6,094,645 | A | | 7/2000 Aggarwal et al. |
| 6,102,969 | A | * | 8/2000 Christianson et al. ......... 717/14 |
| 6,108,651 | A | | 8/2000 Guha |
| 6,108,666 | A | | 8/2000 Floratos et al. |
| 6,131,092 | A | | 10/2000 Masand |
| 6,138,117 | A | | 10/2000 Bayardo |
| 6,167,393 | A | | 12/2000 Davis, III et al. |
| 6,263,327 | B1 | | 7/2001 Aggarwal et al. |
| 6,272,495 | B1 | | 8/2001 Hetherington |
| 6,282,537 | B1 | * | 8/2001 Madnick et al. ............... 707/2 |
| 6,295,533 | B2 | | 9/2001 Cohen |
| 2001/0013035 | A1 | | 8/2001 Cohen |

OTHER PUBLICATIONS

Ioannidis, Y.E. and Wong, E. (1991). "Towards an Algebraic Theory of Recursion," Journal of the ACM, 38(2): 329–381.

Mishra, P. and Eich, M.H. (1992). "Join Processing in Relational Databases," ACM Computing Surverys, 24(1):63–113.

Ashish et al. "Wrapper Generation for Semi–structured Internet Sources", 5–97.

Carey et al. "Towards Heterogenous Multimedia Information Systems: The Garlic Approach". '95.

Chawathe et al. "The TSIMMIS Project: Integration of Heterogenous Information Sources".10–94.

Garcia–Molina et al. "The TSIMMIS Approach to Mediation: Data Models and Languages", p. 1–17. '95.

Hammer et al. "Browsing Object Databases Through the Web". 10–96.

Hammer et al. "Extracting Semistructured Information from the Web", 5–97.

Harrison, Coleman "An Adaptive Query Language for Object–Oriented Databases: Automotive Navigation Through Partially Specified Data Structures", p. 1–31, 10–94.

Levy et al. "Query–Answering Algorithms for Information Agents". 6–96.

Papakonstantinoue et al. "A Query Translation Scheme for Rapid Implementation of Wrappers (Extended Version)" '95.

Papakonstantinou et al. "MedMaker: A Mediation System Based on Declarative Specifications". 2–96.

Papakonstantinou et al. "Object Exchange Across Heterogenous Information Sources". 5–95.

Quass et al, "LORE: A Lightweight Object REpository for Semistructured Data", p. 549. 6–96.

Quass et al. "Querying Semistructured Heterogenous Information", p. 1–41, 12–95.

Wiederhold, Gio "Interoperation, Mediation, and Ontologies," Proceedings International Symposium on Fifth Generation Computer Systems, Workshop on Heterogeous Cooperative Knowledge–Bases, v. W3, p. 33–48, Tokyo, Japan. 12–94.

* cited by examiner

Legend
88   Session/Application Layer
86   Transport Layer
84   Network Layer
82   Data Link Layer
80   Physical Layer (STEP 102 OF FIG. 2A)

METHOD AND APPARATUS FOR CREATING EXTRACTORS, FIELD INFORMATION OBJECTS AND INHERITANCE HIERARCHIES IN A FRAMEWORK FOR RETRIEVING SEMISTRUCTURED INFORMATION

CROSS-REFERENCES TO RELATED APPLICATIONS

This application is a continuation of and claims the benefit of U.S. patent application Ser. No. 09/196,421, filed Nov. 19, 1998 now abandoned, which is a continuation-in-part of and claims the benefit of U.S. Provisional Application No. 60/066,125, filed Nov. 21, 1997, both of which are hereby incorporated by reference. This application is also related to commonly-owned, concurrently filed U.S. application Ser. No. 10000235, entitled "Method for Creating an Information Closure Model," by Ashish Gupta, et. al., which is a continuation of U.S. application Ser. No. 09/196,026, filed Nov. 19, 1998, now abandoned. The disclosure of U.S. application Ser. No. 10/000,235 is hereby incorporated by reference.

This application makes reference to the following commonly owned U.S. Patent, which is incorporated herein in its entirety for all purposes:

Copending U.S. Pat. No. 5,826,258, in the name of Ashish Gupta, et. al., entitled "Method and Apparatus for Structuring the Querying and Interpretation of Semistructured Information," relates to information retrieval and interpretation from disparate semistructured information resources.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates to structured information retrieval and interpretation from disparate semistructured information resources. A particular application of the invention is extraction of information from public and semipublic databases through worldwide information sources, as facilitated by the Internet.

The Internet provides avenues for worldwide communication of information, ideas and messages. Although the Internet has been utilized by academia for decades, recently public interest has turned to the Internet and the information made available by it. The World Wide Web (or "the Web") accounts for a significant part of the growth in the popularity of the Internet, due in part to the user-friendly graphical user interfaces ("GUIs") that are readily available for accessing the Web.

The World Wide Web makes hypertext documents available to users over the Internet. A hypertext document does not present information linearly like a book, but instead provides the reader with links or pointers to other locations so that the user may jump from one location to another. The hypertext documents on the Web are written in the Hypertext Markup Language ("HTML").

As the popularity of the World Wide Web grows, so too does the wealth of information it provides. Accordingly, there may be many sites and pages on the World Wide Web that contain information a user is seeking. However, the Web contains no built-in mechanism for searching for information of interest. Without a searching mechanism, finding sites of interest would literally be like finding a needle in a haystack. Fortunately, there exist a number of web sites (e.g., YAHOO, ALTA VISTA, EXCITE, etc.) that allow users to perform relatively simple keyword searches.

Although keyword searches are adequate for many applications, they fail miserably for many others. For example, there are numerous web sites that include multiple entries or lists on job openings, houses for sale, and the like. Keyword searches are inadequate to search these sites for many reasons. Keyword searches invariably turn up information that, although matching the keywords, is not of interest. This problem may be alleviated somewhat by narrowing the search parameters, but this has the attendant risk of missing information of interest. Additionally, the search terms supported may not allow identification of information of interest. As an example, one may not be able to specify in a keyword search query to find job listings that require less than three years of experience in computer programming.

Ideally, it would be desirable if information like job listings on multiple web sites could appear as a single relational database so that relational database queries could be utilized to find information of interest. However, there is no standard for the structure of information like job listings on the Web. This problem was addressed in a co-owned, U.S. Pat. No. 5,826,258, in the name of Ashish Gupta, et. al., entitled "Method and Apparatus for Structuring the Querying and Interpretation of Semistructured Information," which introduced the concept of "Wrappers" for retrieving and interpreting information from disparate semistructured information resources. Wrappers are programs that interact with web sites to obtain information stored in the web site and then to structure it according to a prespecified schema. In a copending U.S. patent application Ser. No. 10/000,235, in the name of Ashish Gupta, et. al. entitled, "Method for Creating an Information Closure Model" methods for forming the information closure of information gathered by a wrapper are disclosed. However, the methods for formulating extractors, field objects and inheritance hierarchies in a wrapper framework of the present invention are heretofore not known in the art.

What is needed is a method of formulating extractors, field objects and inheritance hierarchies for retrieving and interpreting information from semistructured resources for incorporation into a relational database.

SUMMARY OF THE INVENTION

According to the invention, a system is provided for extracting information from a semistructured information source. The system includes a listing stack for holding extracted information. A means for matching at least one extractor to the semistructured information to return a list of potential matches is also included. The system can also include a means for iterating through the list of potential matches and a means for retrieving information from a particular match in the list of potential matches. A means for adding a particular match into the listing stack can also be part of the system.

In another aspect of the present invention, a method for extracting information from a semistructured information source into a listing stack is provided. The step of matching at least one extractor to the semistructured information in order to return a list of potential matches is included in the method. A step of iterating through the list of potential matches can also be part of the method. Information from a particular match in the list of potential matches can be retrieved in another step. The method can also include a step of adding a particular match into the listing stack. Combinations of these steps can extract information from a semistructured information source.

Numerous benefits are achieved by way of the present invention for enabling the use of a relational database to organize information obtained from a semistructured source, such as Web pages on the World Wide Web, over conventional Web search techniques. In some embodiments, the present invention is easier to use than conventional user interfaces. The present invention can provide way to automatically propagate information to related tuples. Some embodiments according to the invention are easier for new users to learn than known techniques. The present invention enables data mining to be accomplished using a relational database. These and other benefits are described throughout the present specification.

A further understanding of the nature and advantages of the inventions herein may be realized by reference to the remaining portions of the specification and the attached drawings.

DESCRIPTION OF THE SPECIFIC EMBODIMENTS 1.0 Introduction

The present invention provides a system for automated extraction of information from a plurality of semistructured information sources useful for incorporating the tuples into a relational database. Systems according to the present invention enable network programmers to build wrapper programs capable of accessing multiple web sites, extracting information therefrom and incorporating the resulting information into relational databases for search. Table 1 provides a definitional list of terminology used herein.

TABLE 1

LIST OF DEFINITIONAL TERMS

| | |
|---|---|
| Semistructured information | Information that as a whole does not have a precise structure, however, elements within the semistructured information have meanings based on their location or surroundings within the semistructured information. The format of semistructured information may be represented by a grammar or by regular expressions, typically nested regular expressions. |
| Site | A location or object including related, interconnected collection of blocks of text, forms, and the like. For example, a web site may present text as semistructured information in the form of a web page. |
| Agent | A program that serves the information needs of a user. Often an agent will have a visible component. For example, an agent may include a user interface that accepts a user's relational database query and displays the results of the query. |
| Wrapper (or site program) | A software layer that provides a relational database interface to information on a site. |
| Mapper | A component responsible for translating the different site vocabularies into one that an agent understands. Mappers generally reside between agents and wrappers, providing a level of insulation between the two. |

1.1 Hardware Overview

Figure 1A:
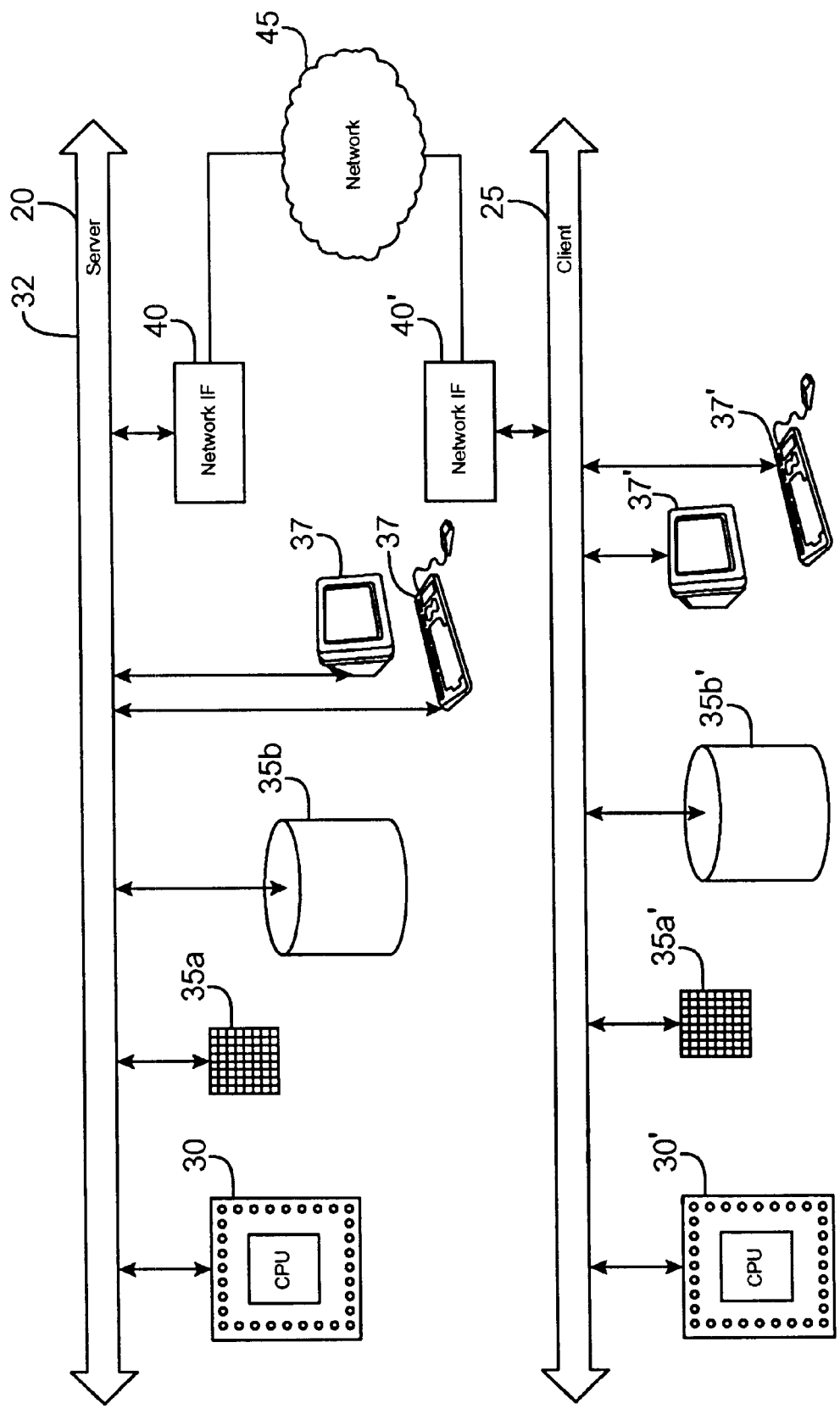
FIG. 1A depicts a representative client server relationship in accordance with a particular embodiment of the invention.

The system for automated extraction of information from a plurality of semistructured information sources of the present invention is implemented in the Perl and Java programming languages and is operational on a computer system such as shown in FIG. 1A. This invention may be implemented in a client-server environment, but a client-server environment is not essential. FIG. 1A shows a conventional client-server computer system which includes a server 20 and numerous clients, one of which is shown as client 25. The use of the term "server" is used in the context of the invention, wherein the server receives queries from (typically remote) clients, does substantially all the processing necessary to formulate responses to the queries, and provides these responses to the clients. However, server 20 may itself act in the capacity of a client when it accesses remote databases located at another node acting as a database server.

The hardware configurations are in general standard and will be described only briefly. In accordance with known practice, server 20 includes one or more processors 30 which communicate with a number of peripheral devices via a bus subsystem 32. These peripheral devices typically include a storage subsystem 35, comprised of memory subsystem 35a and file storage subsystem 35b, which hold computer programs (e.g., code or instructions) and data, set of user interface input and output devices 37, and an interface to outside networks, which may employ Ethernet, Token Ring, ATM, IEEE 802.3, ITU X.25, Serial Link Internet Protocol (SLIP) or the public switched telephone network. This interface is shown schematically as a "Network Interface" block 40. It is coupled to corresponding interface devices in client computers via a network connection 45.

Client 25 has the same general configuration, although typically with less storage and processing capability. Thus, while the client computer could be a terminal or a low-end personal computer, the server computer is generally a highend workstation or mainframe, such as a SUN SPARC™ server. Corresponding elements and subsystems in the client computer are shown with corresponding, but primed, reference numerals.

The user interface input devices typically includes a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, are also possible.

The user interface output devices typically include a printer and a display subsystem, which includes a display controller and a display device coupled to the controller. The display device may be a cathode ray tube (CRT), a flat-panel device such as a liquid crystal display (LCD), or a projection device. Display controller provides control signals to the display device and normally includes a display memory for storing the pixels that appear on the display device. The display subsystem may also provide non-visual display such as audio output.

The memory subsystem typically includes a number of memories including a main random access memory (RAM) for storage of instructions and data during program execution and a read only memory (ROM) in which fixed instructions are stored. In the case of Macintosh-compatible personal computers the ROM would include portions of the operating system; in the case of IBM-compatible personal computers, this would include the BIOS (basic input/output system).

The file storage subsystem provides persistent (non-volatile) storage for program and data files, and typically includes at least one hard disk drive and at least one floppy disk drive (with associated removable media). There may also be other devices such as a CD-ROM drive and optical drives (all with their associate removable media). Additionally, the computer system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site of the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of PCs and workstations.

Bus subsystem 32 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

The user interacts with the system using interface devices 37' (or devices 37 in a standalone system). For example, client queries are entered via a keyboard, communicated to client processor 30', and thence to network interface 40' over bus subsystem 32'. The query is then communicated to server 20 via network connection 45. Similarly, results of the query are communicated from the server to the client via network connection 45 for output on one of devices 37' (say a display or a printer), or may be stored on storage subsystem 35'.

Figure 1B:
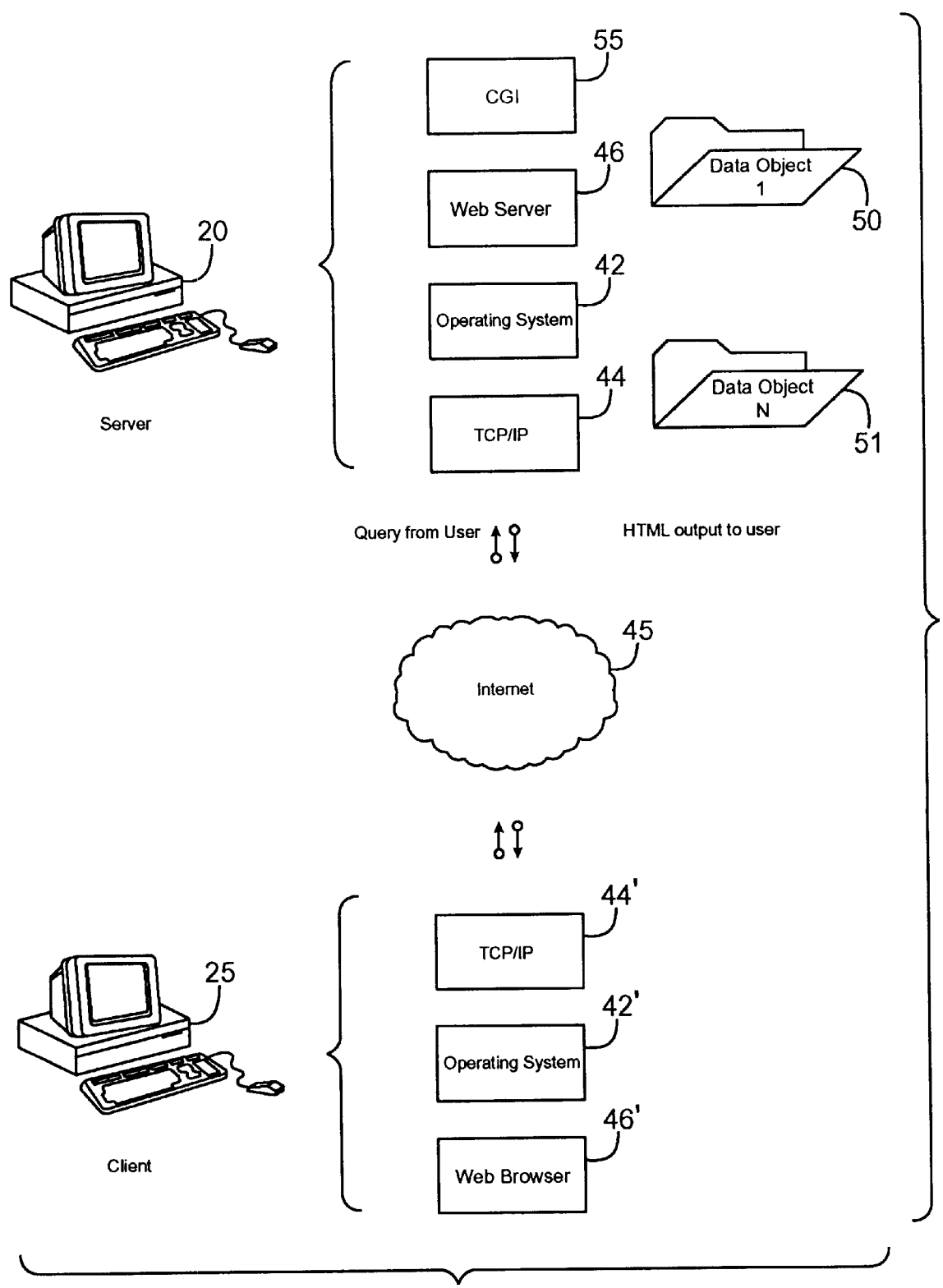
FIG. 1B depicts a functional perspective of the representative client server relationship in accordance with a particular embodiment of the invention.

FIG. 1B is a functional diagram of the computer system of FIG. 1A. FIG. 1B depicts a server 20, and a representative client 25 of a multiplicity of clients which may interact with the server 20 via the internet 45 or any other communications method. Blocks to the right of the server are indicative of the processing components and functions which occur in the server's program and data storage indicated by block 35a in FIG. 1A. A TCP/IP "stack" 44 works in conjunction with Operating System 42 to communicate with processes over a network or serial connection attaching Server 20 to internet 45. Web server software 46 executes concurrently and cooperatively with other processes in server 20 to make data objects 50 and 51 available to requesting clients. A Common Gateway Interface (CGI) script 55 enables information from user clients to be acted upon by web server 46, or other processes within server 20. Responses to client queries may be returned to the clients in the form of a Hypertext Markup Language (HTML) document outputs which are then communicated via internet 45 back to the user.

Client 25 in FIG. 1B possesses software implementing functional processes operatively disposed in its program and data storage as indicated by block 35a' in FIG. 1A. TCP/IP stack 44', works in conjunction with Operating System 42' to communicate with processes over a network or serial connection attaching Client 25 to internet 45. Software implementing the function of a web browser 46' executes concurrently and cooperatively with other processes in client 25 to make requests of server 20 for data objects 50 and 51. The user of the client may interact via the web browser 46' to make such queries of the server 20 via internet 45 and to view responses from the server 20 via internet 45 on the web browser 46'.

1.2 Network Overview

Figure 1C:
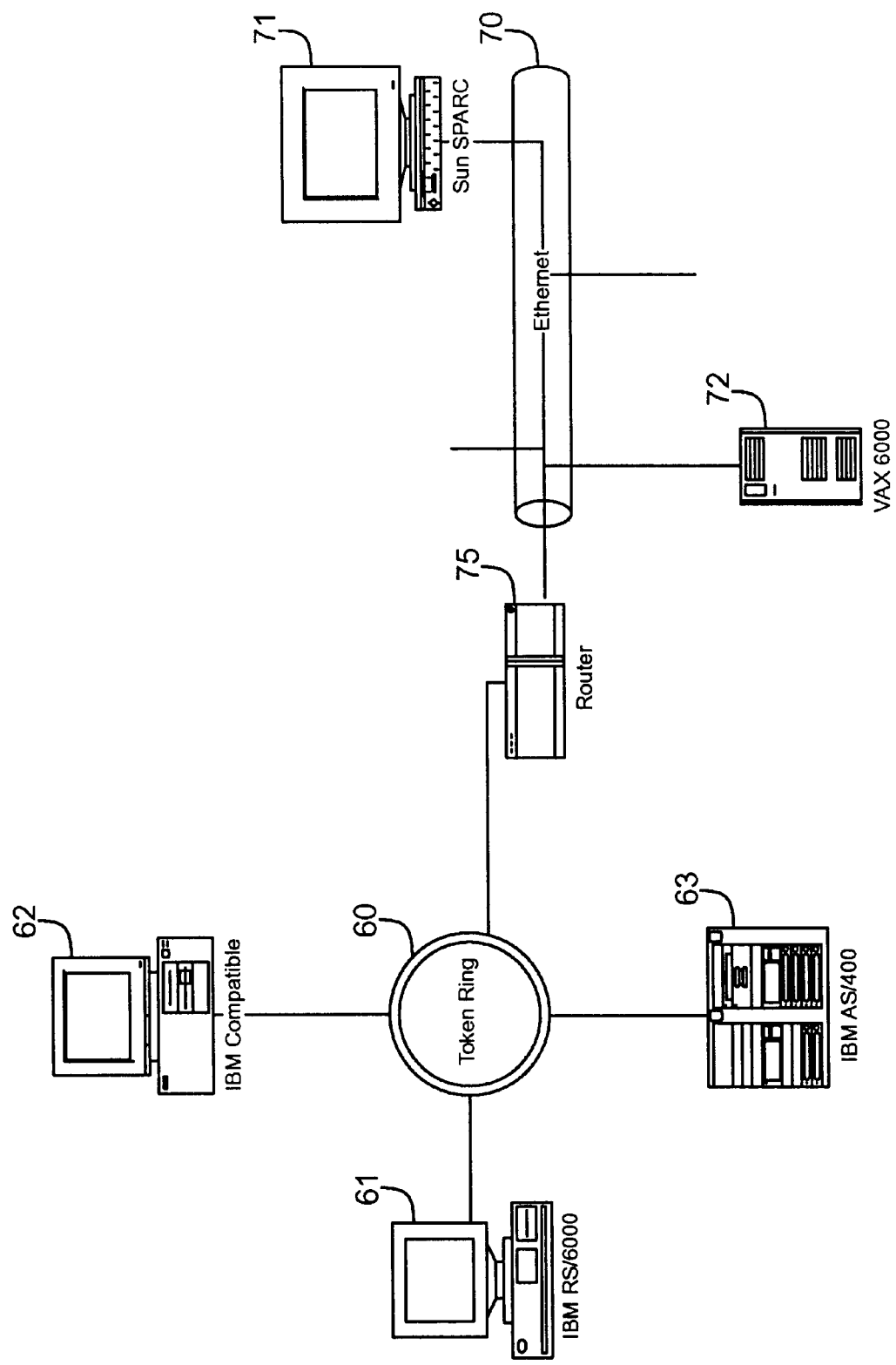
FIG. 1C depicts a representative internetworking environment in accordance with a particular embodiment of the invention.

FIG. 1C is illustrative of the internetworking of a plurality of clients such as client 25 of FIGS. 1A and 1B and a multiplicity of servers such as server 20 of FIGS. 1A and 1B as described herein above. In FIG. 1C, a network 70 is an example of a Token Ring or frame oriented network. Network 70 links a host 71, such as an IBM RS6000 RISC workstation, which may be running the AIX operating system, to a host 72, which is a personal computer, which may be running Windows 95, IBM OS/2 or a DOS operating system, and a host 73, which may be an IBM AS/400 computer, which may be running the OS/400 operating system. Network 70 is internetworked to a network 60 via a system gateway which is depicted here as router 75, but which may also be a gateway having a firewall or a network bridge. Network 60 is an example of an Ethernet network that interconnects a host 61, which is a SPARC workstation, which may be running SUNOS operating system with a host 62, which may be a Digital Equipment VAX6000 computer which may be running the VMS operating system.

Router 75 is a network access point (NAP) of network 70 and network 60. Router 75 employs a Token Ring adapter and Ethernet adapter. This enables router 75 to interface with the two heterogeneous networks. Router 75 is also aware of the Inter-network Protocols, such as ICMP ARP and RIP, which are described below.

Figure 1D:
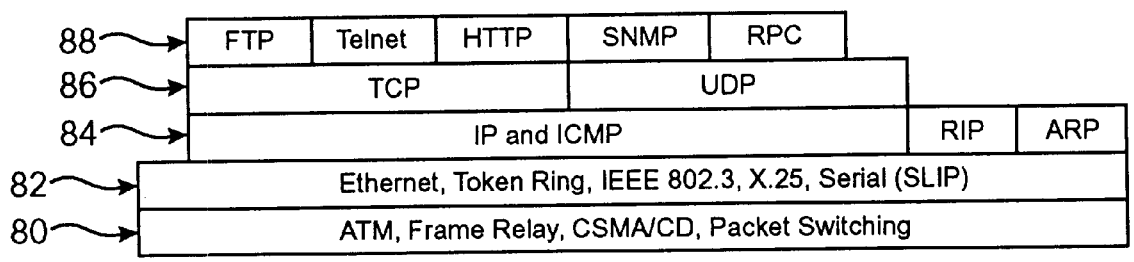
FIG. 1D depicts a relationship diagram of the layers of the TCP/IP protocol suite.

FIG. 1D is illustrative of the constituents of the Transmission Control Protocol/Internet Protocol (TCP/IP) protocol suite. The base layer of the TCP/IP protocol suite is the physical layer 80, which defines the mechanical, electrical, functional and procedural standards for the physical transmission of data over communications media, such as, for example, the network connection 45 of FIG. 1A. The physical layer may comprise electrical, mechanical or functional standards such as whether a network is packet switching or frame-switching; or whether a network is based on a Carrier Sense Multiple Access/Collision Detection (CSMA/CD) or a frame relay paradigm.

Overlying the physical layer is the data link layer 82. The data link layer provides the function and protocols to transfer data between network resources and to detect errors that may occur at the physical layer. Operating modes at the datalink layer comprise such standardized network topologies as IEEE 802.3 Ethernet, IEEE 802.5 Token Ring, ITU X.25, or serial (SLIP) protocols.

Network layer protocols 84 overlay the datalink layer and provide the means for establishing connections between networks. The standards of network layer protocols provide operational control procedures for internetworking communications and routing information through multiple heterogenous networks. Examples of network layer protocols are the Internet Protocol (IP) and the Internet Control Message Protocol (ICMP). The Address Resolution Protocol (ARP) is used to correlate an Internet address and a Media Access Address (MAC) of a particular host. The Routing Information Protocol (RIP) is a dynamic routing protocol for passing routing information between hosts on networks. The Internet Control Message Protocol (ICMP) is an internal protocol for passing control messages between hosts on various networks. ICMP messages provide feedback about events in the network environment or can help determine if a path exists to a particular host in the network environment. The latter is called a "Ping". The Internet Protocol (IP) provides the basic mechanism for routing packets of information in the Internet. IP is a non-reliable communication protocol. It provides a "best efforts" delivery service and does not commit network resources to a particular transaction, nor does it perform retransmissions or give acknowledgments.

The transport layer protocols 86 provide end-to-end transport services across multiple heterogenous networks. The User Datagram Protocol (UDP) provides a connectionless, datagram oriented service which provides a non-reliable delivery mechanism for streams of information. The Transmission Control Protocol (TCP) provides a reliable session-based service for delivery of sequenced packets of information across the Internet. TCP provides a connection oriented reliable mechanism for information delivery.

The session, or application layer 88 provides a list of network applications and utilities, a few of which are illustrated here. For example, File Transfer Protocol (FTP) is a standard TCP/IP protocol for transferring files from one machine to another. FTP clients establish sessions through TCP connections with FTP servers in order to obtain files. Telnet is a standard TCP/IP protocol for remote terminal connection. A Telnet client acts as a terminal emulator and establishes a connection using TCP as the transport mechanism with a Telnet server. The Simple Network Management Protocol (SNMP) is a standard for managing TCP/IP networks. SNMP tasks, called "agents", monitor network status parameters and transmit these status parameters to SNMP tasks called "managers." Managers track the status of associated networks. A Remote Procedure Call (RPC) is a programming interface which enables programs to invoke remote functions on server machines. The Hypertext Transfer Protocol (HTTP) facilitates the transfer of data objects across networks via a system of uniform resource indicators (URI).

The Hypertext Transfer Protocol is a simple protocol built on top of Transmission Control Protocol (TCP). It is the mechanism which underlies the function of the World Wide Web. The HTTP provides a method for users to obtain data objects from various hosts acting as servers on the Internet. User requests for data objects are made by means of an HTTP request, such as a GET request. A GET request as depicted below is comprised of 1) an HTTP protocol version, such as "http:/1.0"; followed by 2) the full path of the data object; followed by 3) the name of the data object. In the GET request shown below, a request is being made for the data object with a path name of "/pub/" and a name of "MyData.html":

$$\text{HTTP-Version GET/pub/MyData.html} \qquad (1)$$

Processing of a GET request entails the establishing of an TCP/IP connection with the server named in the GET request and receipt from the server of the data object specified. After receiving and interpreting a request message, a server responds in the form of an HTTP RESPONSE message.

Response messages begin with a status line comprising a protocol version followed by a numeric Status Code and an associated textual Reason Phrase. These elements are separated by space characters. The format of a status line is depicted in line (2):

$$\text{Status-Line=HTTP-Version Status-Code Reason-Phrase} \qquad (2)$$

The status line always begins with a protocol version and status code, e.g., "HTTP/1.0 200" The status code element is a three digit integer result code of the attempt to understand and satisfy a prior request message. The reason phrase is intended to give a short textual description of the status code.

The first digit of the status code defines the class of response. There are five categories for the first digit. 1XX is an information response. It is not currently used. 2XX is a successful response, indicating that the action was successfully received, understood and accepted. 3XX is a redirection response, indicating that further action must be taken in order to complete the request. 4XX is a client error response. This indicates a bad syntax in the request. Finally, 5XX is a server error. This indicates that the server failed to fulfill an apparently valid request.

2.0 Defining a Wrapper for Semi-structured Information

The process of generating a wrapper for extracting attributes of interest from semistructured information, such as from web data objects, for incorporation into a relational database is more fully described in U.S. Pat. No. 5,826,258, in the name of Ashish Gupta, et. al., entitled "Method and Apparatus for Structuring the Querying and Interpretation of Semistructured Information," which is incorporated herein by reference for all purposes. The wrapper extracts the attributes of interest from the semistructured information and produces tuples, which may be provided to a relational database system. Once the wrapper for specific semistructured information is executed, a user may generate a relational database query (e.g., SQL query) which operates on the tuples produced by the wrapper. Accordingly, the relational database system views the semistructured information as one or more database tables as a result of the wrapper's processing.

Figure 2A:
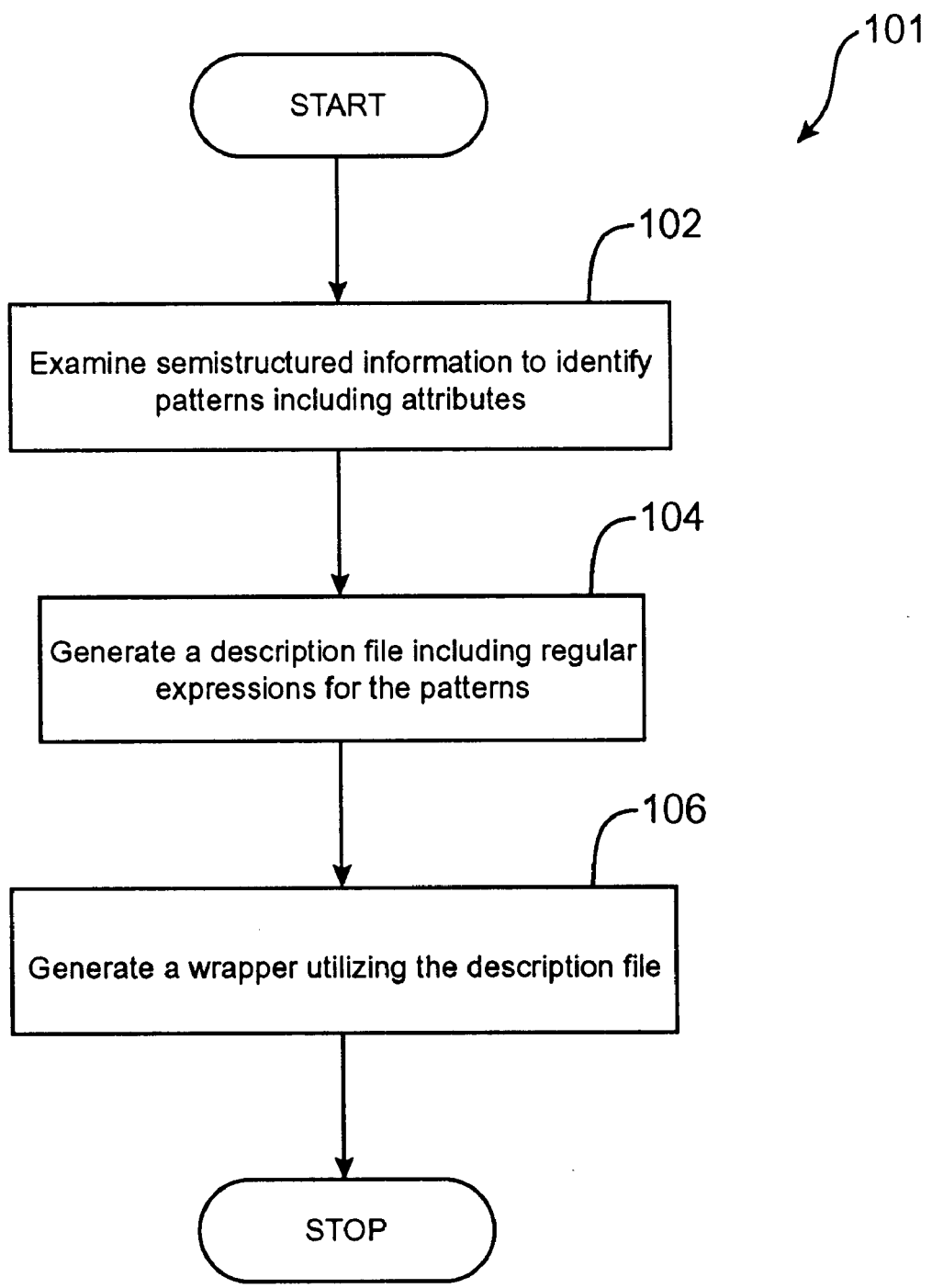
FIG. 2A depicts a flowchart of process steps in producing a wrapper in accordance with a particular embodiment of the invention.

FIG. 2A depicts a flowchart 101 of a processes of defining, generating and using a wrapper to access semistructured information from disparate semistructured information sources. As previously taught in the art, a wrapper may be described using a description language called a Site Description Language (SDL), which provides mechanisms for specifying different types of interactions between the wrapper and data sources. In a step 102, semistructured information is examined to identify patterns including attributes. In step 104, SDL statements describing patterns are specified in a definitional file. Next, in a step 106, the definitional file produced in step 104 is acted upon by a compiler or an interpreter to produce a wrapper. Typically, multiple wrappers corresponding to different semistructured information are generated for a particular application. Additionally, one or more mappers may be provided in order to translate attributes within semistructured information to fields in the relational database schema.

Figure 2B:
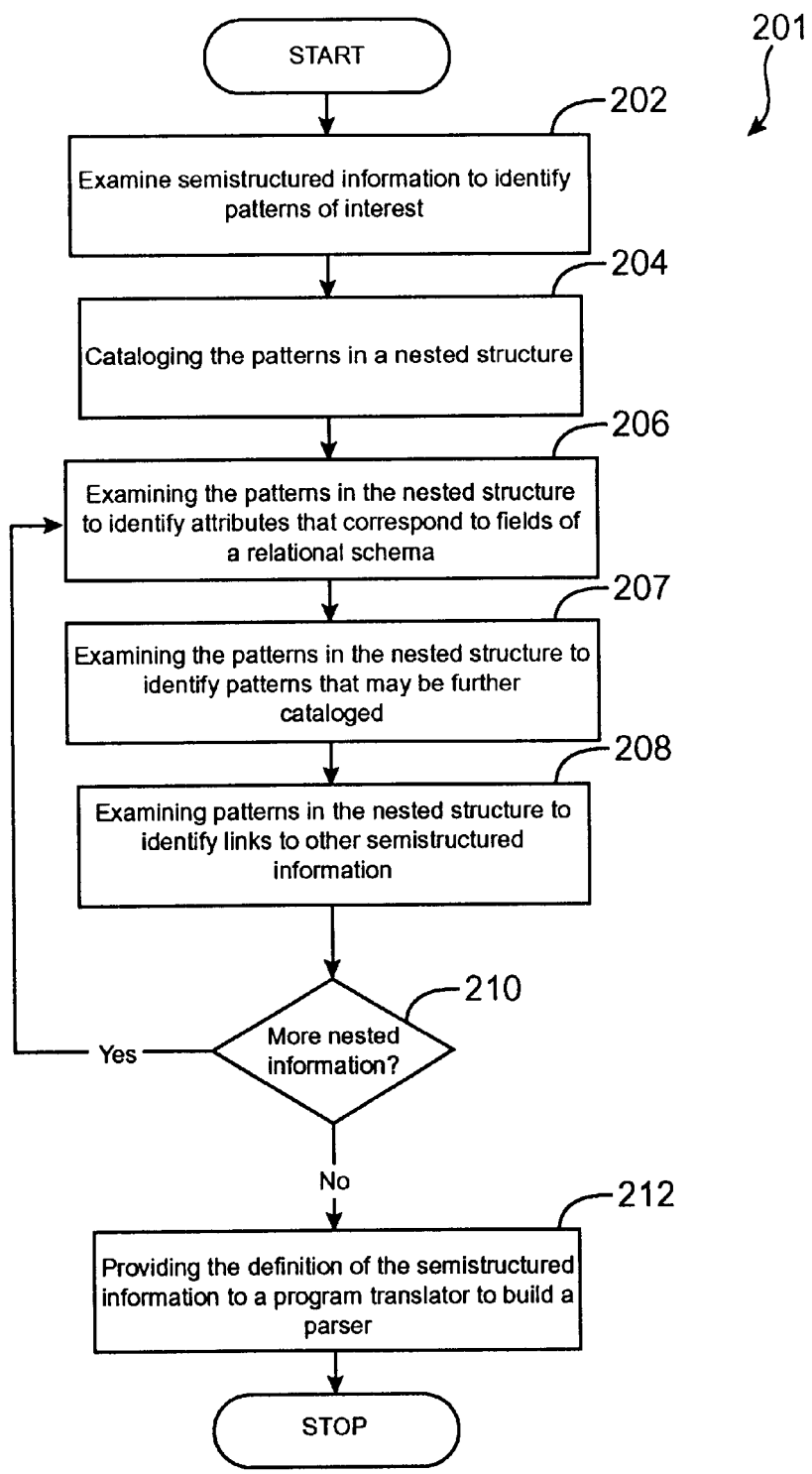
FIG. 2B depicts a flowchart of process steps in defining a wrapper in accordance with a particular embodiment of the invention.

FIG. 2B depicts a flowchart 201 showing the process steps for defining a wrapper according to step 102 of flowchart 101. In step 202, the semistructured information is examined for repetitive patterns of interest using lexical analysis techniques, as are well known to persons of ordinary skill in the art. These repetitive patterns of interest include one or more attributes.

In step 204, the occurrences of the patterns in the semistructured information are cataloged by name and position in a nested structure without a priori information, i.e., there is no requirement that a user have prior knowledge or perform any prior programming before the patterns are cataloged. In one embodiment, the nested structure is a graph representing the nesting of the attributes within the semistructured information. Typically, many of the attributes of the nested structure correspond to fields of a relational database schema.

In a step 206, the patterns in the nested structure are examined to identify attributes that correspond to fields of a relational database schema. After these attributes are identified, regular expressions are generated that specify the location of the attributes within the semistructured information. The regular expressions may be generated as soon as these attributes are identified or when the definition of the semistructured information is written to a file. Thus, the generation of the regular expressions need not be performed at any specific time.

In step 207, the patterns in the nested structure are examined to identify patterns that may be further cataloged. Some patterns of interest may be further broken down into sub-component patterns of interest. Each one of these patterns that is identified is decomposed into its constituent patterns. These constituent patterns are then cataloged in the nested structure for further examination.

In a step 208, the patterns in the nested structure are examined to identify links to other semistructured information. The links identified in step 208 point to other semistructured information that may include patterns of interest and attributes. The links are traversed to further semistructured information, which is examined for patterns of interest. If patterns of interest are discovered, they are cataloged in the nested structure. Typically, the links are Uniform Resource Locator ("URL") addresses of web pages. However, the links may also point to a program which, when executed, will generate semistructured information output. In the later case, the program is executed and the output is examined.

In a decisional step 210, it is determined whether there is more nested information to examine. If more nested information exists, then it is examined to identify attributes corresponding to fields in the relational database schema identified in step 206. Although steps 206, 207 and 208 are shown in a particular order, it is not required that these steps, like many other steps in the flowcharts, be performed in the order shown. Thus, the order shown in the flowcharts is to illustrate one embodiment and not intended to limit the invention.

Otherwise, if there is not more nested information to examine, then in a step 212, a definition of the semistructured information is provided, which serves as input to a program translator to build a parser. This definition of the semistructured information comprises regular expressions having attributes corresponding to fields of the relational database schema. The regular expressions specify locations of the attributes within the semistructured information that correspond to the relational database schema. Thus, the wrapper, produced by the program translator, includes a parser that is capable of parsing the semistructured information for attributes so that these attributes can be presented to a relational database system as tuples when the wrapper executes.

In one embodiment, the program translator is a compiler, which generates a parser by receiving the definition file as input and generating a program (i.e., the parser) for extracting attributes from the semistructured information that correspond to fields of the relational database schema to form tuples. In an alternative embodiment, the program translator is an interpreter, which generates a parser from the definition of the semistructured information and the semistructured information as inputs, by extracting attributes from the semistructured information that correspond to fields of the relational schema to form tuples.

2.1 Defining a Wrapper to Collect Information

Figure 2C:
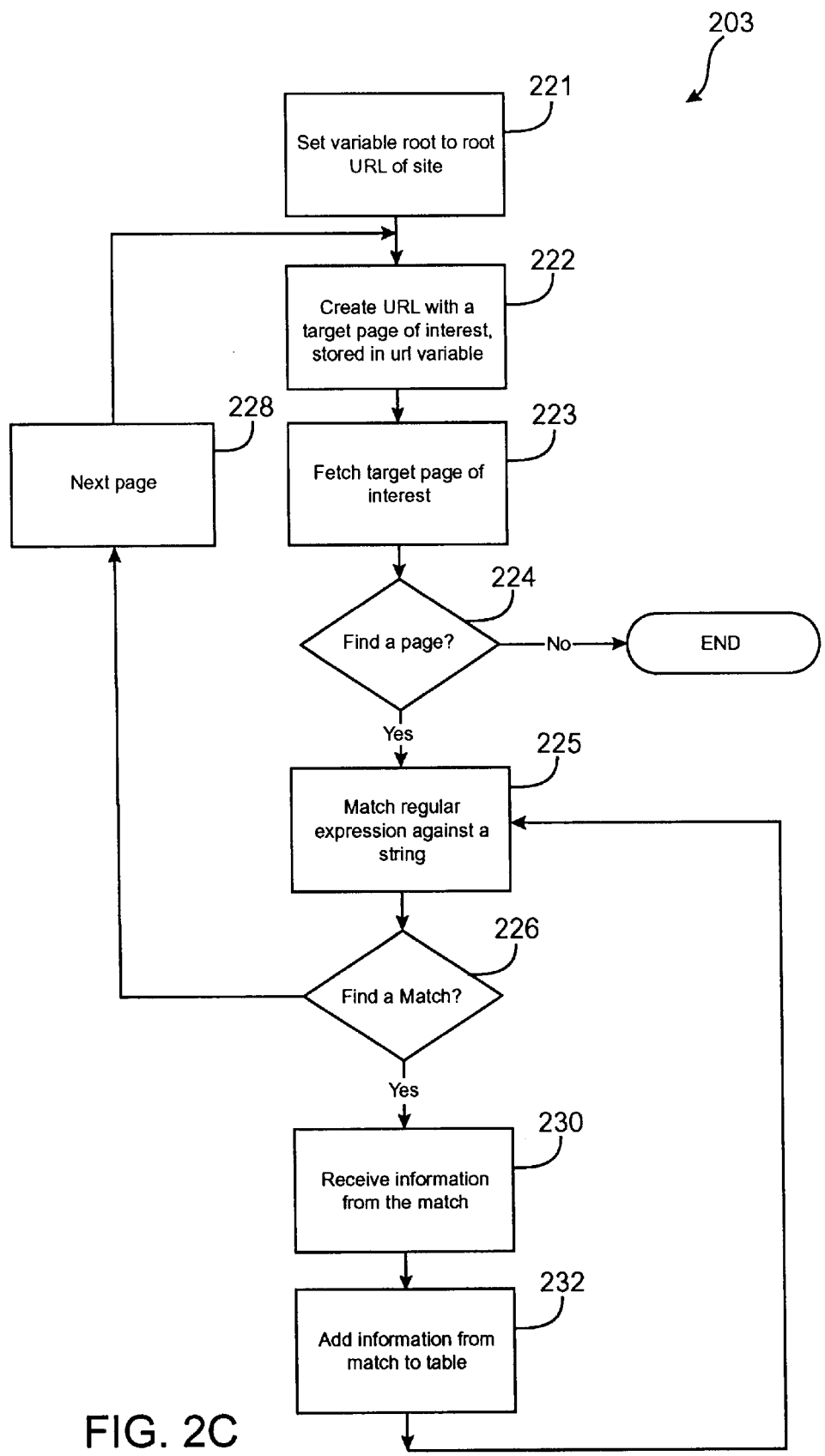
FIG. 2C depicts a flowchart of process steps in the execution of a wrapper in accordance with a particular embodiment of the invention.

FIG. 2C depicts a flowchart 203 showing process steps performed by a typical wrapper in traversing web pages to collect semistructured information according to a particular embodiment of the present invention. In a step 221, a variable root is set to be the root URL of a particular site. In a step 222, a URL is created for a target site of interest with a call to a url( ) function. For example, url("://www.company.com") or, for forms that take a relative URL string and a context, url("next-page.html", root). Next, in a step 223, a web page corresponding to the url created in step 222 is fetched with a getString(url) function. In decisional step 224, if step 223 failed to fetch a web page, the routine terminates and processing returns. Otherwise, in a step 225, a regular expression is matched against a string of input representing the web page fetched in step 223 as depicted in line 1 below:

| 1. | Matches m = match(1, string, "pattern"); |
| 2. | while(m.next()) {/* do something*/} |

The match( ) function returns a list of possible matches which can be cycled through with a next( ) function, as depicted in line 2 above. Each call to next( ) returns the next match of the pattern. Table 2 lists the parameters of the match( ) function, in accordance with a particular embodiment of the present invention:

TABLE 2

MATCH FUNCTION PARAMETERS

| | |
|---|---|
| id | An integer identifier for this match. It is used two ways: first, compiled patterns are cached under this index, eliminating the need to re-compile patterns unless the pattern actually changes. Second, if the id is a negative number, debugging output is available for this match. The idea is that when debugging, instant feedback for one pattern match is available by adding a "-". |
| input | Either a string or a URL. If it is a URL, a function getString() is applied to it to get the contents of the URL page. |
| pattern | A matching pattern which uses the pattern syntax of the Perl 5 programming language. Note that two backslashes are used wherever Perl uses one, because of the way Java defines strings. Also note that Perl variable interpolation ("pattern $var more pattern") is not implemented in this embodiment, however, statements such as, "pattern" + var + "more pattern" are permitted. |
| mask | (optional) A mask of options, formed by or-ing together a plurality of bits: I (ignore case), S (single line) and X (extended match). If match is not specified, it defaults to a value of matchDefault, which is initially Matcher.I\|Matcher.S. There is also a match1 function, which performs a single match (i.e., does not iterate) and a matchIt function, which performs a single match, containing a single pair of parens, and returns a string matching the parens. Finally, a substitute function is available for making changes based on a regular expression match. |

In a decisional step 226, the existence of a match is determined, and if no match is found, processing proceeds with step 228, obtaining the next page. Otherwise, if a match has occurred, then in a step 230, information is retrieved from the match. A group(i) function is provided to retrieve matches. A basic pattern for matching is described in line 4 below. Use of the group(i) function is depicted in line 6 below:

```
4    Matches m = match(1, string, "1:(.*?)2:(.*?)3", I|S);
5    while(m.next()) {
6        String s1 = m.group(1), s2 = m.group(2);
7        /* do something */
8    }
```

In a step 232, information retrieved from a match is added to the listing stack using a set( ) function, as depicted in line 13 below. In a step 234, the contents of the listing stack are placed in a table using the emit ( ) function, as depicted in line 14 below:

```
9     Matches m = match(1, string, "Title:(.*?)Description:(.*?)Other", I|S);
10    while(m.next()) {
11        mark();
12        String s1 = m.group(1), s2 = m.group(2);
13        set(LITERAL|JOB_TITLE, s1, AD_TEXT, s2);
14        emit();
15        reset();
16    }
```

Table 3 lists the parameters of the set( ) function:

TABLE 3

SET FUNCTION PARAMETERS

| | |
|---|---|
| LITERAL\|<br>JOB_TITLE | Indicates that the job title should be processed literally, i.e., not normalized with a rule. If EXTRACT\|JOB_TITLE is specified, a normalization occurs. If just JOB_TITLE is specified, then results depend on the value of a parameter extractDefault. It is initially set to EXTRACT, but is user modifiable. |

A set( ) function adds information to the table that is the answer to a query. In this example, two sets of attribute/value pairs are specified: a job title is s1 and an ad text is s2. In this embodiment, from 1 to 6 attribute/value pairs are permitted. There is also a version of set( ) that takes an array of fields and an array of String values. A mark( ) and a reset( ) functions are used to show the starting and ending, respectively, of a portion of a listing. Each match of the pattern represents a separate instance of information, here a job listing, the information for which must be kept separate from all others. This is accomplished by using mark( ) at the beginning of each listing, and reset( ) at the end. An emit( ) function specifies that collected data is to be passed to the table as part of the answer to the query. Typically, emit( ) appears at the end of an innermost loop. Emit( ) processing automatically extracts fields that have not been assigned within the course of wrapper processing.

The foregoing is provided as an example of a particular embodiment and not intended to be limiting of the invention to a particular order of processing. For example, the processing could have been described as in lines 17–23 below:

```
17    Matches m = match(1, string, "Title:(.*?)Description:(.*?)Other", I|S);
18    while(m.next()) {
19        mark();
20        setFromMatch(m,LITERAL|JOB_TITLE, AD_TEXT);
21        emit();
22        reset();
23    }
```

3.0 The Listing Stack and the Execution Model

The foregoing example depicts a typical processing of a wrapper in a particular embodiment. A key concept is called a listing stack. Each call to set( ) adds a new listing to the listing stack. Each call to emit( ) causes the listing stack to be converted into a sequence of rows in a table, which sequence of rows serves to answer the original query.

3.1 The Listing Class and the Set Method

An individual listing consists of a number of fields (or attributes, or columns), each of which may be empty, may be filled with a single value, or may be filled with a vector of values. An empty column corresponds to "don't know". A vector of values corresponds to "all of the above". That is, adding the listing in line 24 below to the stack:

```
24            [A: a1, B: [b1, b2]]
``` using, for example, set(A,a1, B,new Object[ ]{b1, b2}), is equivalent to adding the two listings of lines 25–26 below:

| 25 | [A: a1, B: b1] |
| 26 | [A: a1, B: b2] |

If there are multiple vectors in a listing, the effect is to compute the cross product: a separate listing for every possible combination. That is, adding the following listing to the stack:

| 27 | [A: [a1, a2], B: [b1, b2], C: c] | is equivalent to adding the following four listings:

| 28 | [A: a1, B: b1, C: c] |
| 29 | [A: a1, B: b2, C: c] |
| 30 | [A: a2, B: b1, C: c] |
| 31 | [A: a2, B: b2, C: c] |

3.2 The Listing Stack Class and the Emit Method

A listing stack is a representation of a table having a sequence of rows. The emit function converts a listing stack into a table. Emit function processing can be described by the following rule:

Given a listing stack is, a row r is a candidate member of the resulting table if and only if r can be formed by starting with an all-null row and then repeatedly selecting some row s from is and filling in any null fields in r with the corresponding field values from s.

After all possible candidate rows r have been generated, remove any duplicates, as well as any rows that are subsumed by another row. (A row s subsumes a row r if they are the same except that in one or more fields r has null and s has a non-null value.) The resulting set of rows derived in this way the information closure of Is. The rule is a little abstract, so let's look at some examples. First, the simple cases:

When the elements of the listing stack all have the same fields filled, like the four-element stack above, the resulting table is the same as the listing stack. When the elements of the listing stack all have different fields filled, the resulting table has a single row with all the fields combined. That is, the listing stack:

| 32 | [A: a1, B: b1    ] |
| 33 | [       C: c1    ] |
| 34 | [       D: d1]     | is equivalent to the single row table:

| 35 | [A: a1, B: b1, C: c1, D: d1] |

When there are several listings with one set of fields, and other listings with another set of fields, they combine as follows:

| 36 | [A: a1, B: b1    ] |
| 37 | [A: a2, B: b2    ] |
| 38 | [       C: c1, D: d1] |
| 39 | [       C: c2, D: d2] | is equivalent to the four row table:

| 40 | [A: a1, B: b1, C: c1, D: d1] |
| 41 | [A: a1, B: b1, C: c2, D: d2] |
| 42 | [A: a2, B: b2, C: c1, D: d1] |
| 43 | [A: a2, B: b2, C: c2, D: d2] |

Note that it is not equivalent to the 16-row table that would result from the full cross product. If two attribute/value pairs appear together in a row (like [A: a1, B: b1]), they will stay together.

In every case, the creation of the resulting table can be described as "group together the similar listings, and form the cross product of the groups", with the understanding that an empty column in a listing does not mean "no entries" (or else the cross product would be empty), rather it means "unknown entries".

Now for the complicated case: when there are listings that overlap in the fields they have filled. First we'll limit ourselves to exactly two listings, called L1 and L2. The resulting table is then formed from filling in the non-empty columns of L1 with the corresponding columns of L2, and similarly filling the non-empty columns of L2 from L1. For example:

| 44 | [A: a1, B: b1, C: c1    ] |
| 45 | [       B: b2, C: c2, D: d1] | is equivalent to the table:

| 46 | [A: a1, B: b1, C: c1, D: d1] |
| 47 | [A: a1, B: b2, C: c2, D: d1] |

In a more complex example, the following listing stack:

| 48 | [N: Name1, F:Fax1                                              ] |
| 49 | [N: Name2,       P: Phone2,                                    ] |
| 50 | [                          A:Area                              ] |
| 51 | [                                  C: Sunnyvale, S: CA, T: Manager ] |
| 52 | [                                  C: Boston , S: MA, T:Programmer .. ] | is equivalent to this table:

| 53 | [N: Name1, F:Fax1, P: Phone2, A: Area, C: Sunnyvale, S: CA, T: Manager] |
| 54 | [N: Name2, F:Fax1, P: Phone2, A: Area, C: Sunnyvale, S: CA, T: Manager] |
| 55 | [N: Name1, F:Fax1, P: Phone2, A: Area, C: Boston, S: MA, T:Programmer] |
| 56 | [N: Name2, F:Fax1, P: Phone2, A: Area, C: Boston, S: MA, T:Programmer] |

The processing steps are that the F, P, and A columns must be filled with the only possible value. Remaining is one group of two rows with values for C, S and T, and another group of two rows with values for N (and either F or P, but these have already been dealt with). Therefore, form the cross-product of the two N rows with the two C/S/T rows to get four rows, and then fill in the blanks with the only possible values.

This result may or may not be exactly what was desired. If the fax and phone numbers are for the office in general, and just happened to be listed near the two names, then this is correct. But if the fax is associated with one name and the phone with another, then it is necessary to set P to NOVALUE for Name1, and set F to NOVALUE for name2. The result is the listing stack:

| 57 | [N: Name1, F: Fax1, P:NOVALUE | ] |
| 58 | [N: Name2, F: NOVALUE P:Phone2, | ] |
| 59 | [ A:Area | ] |
| 60 | [ C: Sunnyvale, S: CA, T:Manager | ] |
| 61 | [ C: Boston, S: MA, T:Programmer | ] | which is equivalent to this table:

| 62 | [N: Name1, F:Fax1, P: NO VALUE, A: Area, C: Sunnyvale, S: CA, T: Manager ] |
| 63 | [N: Name2, F:NOVALUE, P: Phone2, A: Area, C: Sunnyvale, S: CA, T: Manager ] |
| 64 | [N: Name1, F:Fax1, P: NOVALUE, A: Area, C: Boston, S: MA, T: Programmer ] |
| 65 | [N: Name2, F:NOVALUE, P: Phone2, A: Area, C: Boston, S: MA, T: Programmer] |

In general, each listing comprises fields from a closed set—in other words, a complete set of fields for which no other values are permitted. For example, City/State/Zip go together, as do Job Title and Job category. The set of potential values can be restricted by setting all values not of interest to NOVALUE.

Further defaults are possible. In a particular embodiment, further defaults will be provided by allowing listings that are marked as "default" in some way. Then, for example, a listing could give "408" as the default area code, and fill in this value for listings that were missing an area code, but would not propagate the value to listings that did have an area code. In terms of the information closure algorithm, values from a default listing can be copied into a row r only if there is no other row that could fill that field, given the current state of r.

Information listings could be defined having associated priority or probability meta data.

3.2 Listing Stack to Table Algorithm

Figure 2D:
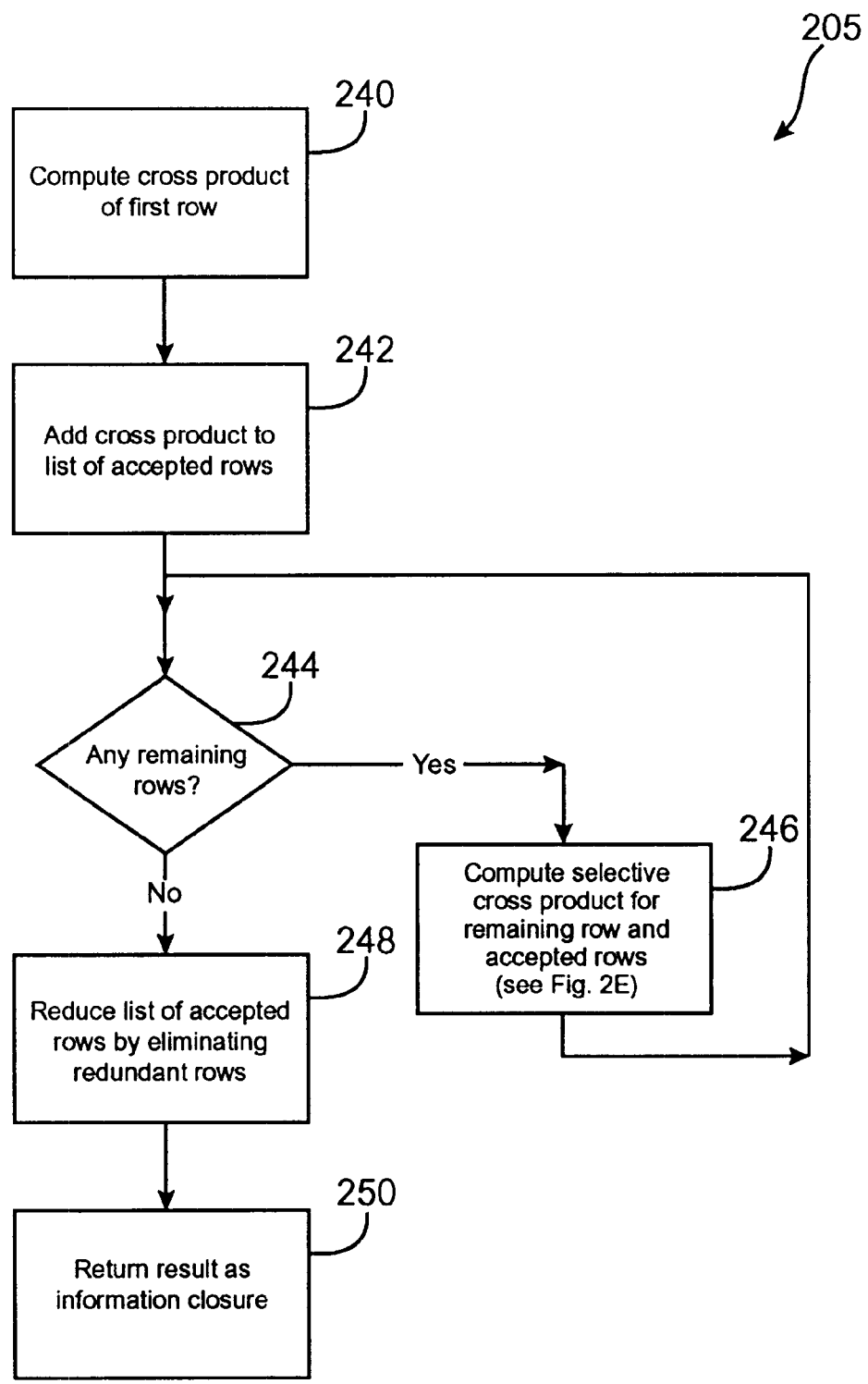
FIG. 2D depicts a flowchart of process steps in computing an information closure for a listing stack in a wrapper in accordance with a particular embodiment of the invention.

FIG. 2D depicts a flowchart 205 showing the steps for computing an information closure for a set of rows in a listing stack. In a step 240, a cross product is computed for the first row in the listing stack. In a step 242, the cross product computed in step 240 is added to a list of accepted rows. In a decisional step 244, a check is done for any further remaining rows in the linkage stack. If a remaining row is found, then in a step 246, a selective cross product is computed on the remaining row and the list of accepted rows started in step 240. Otherwise, if no further rows remain, then in a step 248, the list of accepted rows is reduced by eliminating rows having identical fields. Finally, in a step 250, the resulting list of accepted rows is provided as the information closure. The pseudo code for this algorithm is depicted in the lines below:

```
66  function getRows(Listing stack 1s) {
67    row1 = pop off the top element of 1s
68    rows = the cross product of fields in row1
69         // This is just {row1} if row1 has no Vector-valued fields.
70    for each remaining row r in 1s {
71      rows = selectiveCrossProduct(rows, r)
72    }
73    eliminate duplicates from rows
74    return rows
75  }
```

Figure 2E:
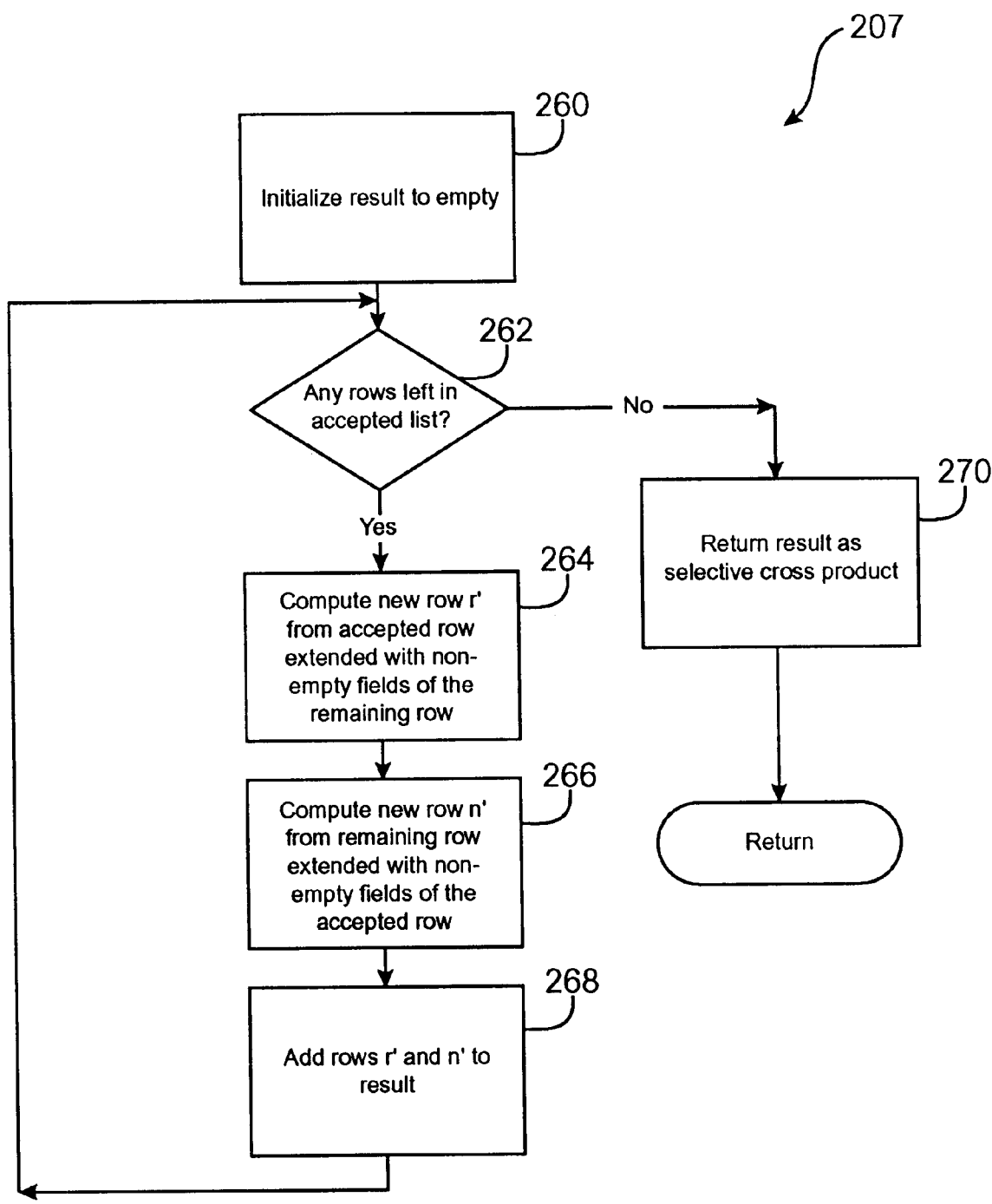
FIG. 2E depicts a flowchart of process steps in computing a selective cross product for determining an information closure for a listing stack in a wrapper in accordance with a particular embodiment of the invention.

FIG. 2E depicts a flowchart 207 showing the component steps for step 246 of FIG. 2E, computing the selective cross product for a list of accepted rows and a remaining row. In a step 260, an interim result is initialized to empty. Next, in a decisional step 262, a determination is made whether there are any further rows in the list of accepted rows to process. If there are further rows to process, then processing of the next accepted row in the list continues in a step 264, in which a new row r' is computed from the accepted row extended with non-empty fields of the remaining row passed to the routine. Then, in a step 266, a new row n' is computed from the remaining row passed to the routine extended with non-empty fields of the accepted row. Next, in a step 268, rows r' and n' are added to the result, and processing continues with the next row in the accepted row list at step 262. If in step 262, there are no further rows to process, then in a step 270, the routine returns the result as the selective cross product. The pseudo code for this algorithm is depicted in the lines below:

```
76  function selectiveCrossProduct(rows, newRow) {
77    result = empty table
78    for each row r in rows {
79      r' = r extended with the non-empty fields in newRow
80      n' = newRow extended with the non-empty fields in r
81      add rows r' and n' to result
82    }
83    return result
84  }
```

3.3 The mark( ) and reset( ) Methods

The mark( ) and reset( ) methods also operate on the listing stack. They keep track of progress during the traversal of a site, and release information that is no longer of interest, because the corresponding table entries have already been emitted. For example, a site may have some common information, such as a header page (perhaps the contact phone and fax numbers), followed by specific information for each job on separate pages. The corresponding wrapper would be:

```
85    // get and set the common information
86    set(PHONE, s1, FAX, s2);
87    while(...) {
88      mark();
89      // get and set the information for this job
90      set(TITLE, s3, LOCATION, s4, ...);
91      reset();
92      emit;
93    }
```

The reset( ) sets the listing stack back to the state it was in at the previous mark( ), thereby discarding the job just processed, but keeping the common information that came before the mark( ). In certain instances, omitting the mark( ) and reset( ) yields the same results because of the way the information closure algorithm is defined. However, it is more efficient to include mark( )/reset( ) when possible.

The described method can be especially useful in the area of electronic commerce applications. For example, an online book or music store could be created using the methods of the invention to process semistructured information about music and book offerings. The person of ordinary skill in the art will appreciate that semistructured infromation about other products and services can be processed by embodiments according to the present invention.

4.0 Conclusion

In conclusion the present invention provides for a system for automated extraction of information from a plurality of semistructured information sources. An advantage of the present invention is that information is automatically propagated to related tuples. A further advantage of the present invention is that it enables the use of a relational database to organize information obtained from a semistructured source, such as web pages on the world wide web. A yet further advantage of the present invention is that it enables data mining to be accomplished using a relational database.

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A system for extracting information from a semistructured information source comprising:
   a listing stack for holding extracted information;
   a means for matching at least one extractor to said semistructured information to return a list of potential matches;
   a means for iterating through said list of potential matches;
   a means for retrieving information from a particular match in said list of potential matches;
   a means for adding a particular match into said listing stack;
   means for computing a cross product of fields in a first row from said listing stack;
   means for adding said cross product of the fields in said first row to a list of accepted rows;
   means for computing a selective cross product from a remaining row r and the list of accepted rows, for each remaining row r in a plurality of remaining rows in said listing stack; and
   means for removing from the list of accepted rows at least one of a plurality of rows having identical fields.

2. The system of claim 1 further comprising:
   a means for indicating the start of a group of associated information in said listing stack.

3. The system of claim 2 further comprising: a means for indicating the end of a group of associated information in said listing stack.

4. The system of claim 1 further comprising: a table for holding information;

a means for converting information stored in said listing stack to a plurality of rows in said table.

5. The system of claim 1 further comprising:
   a means for returning a string for a URL.

6. The system of claim 1 wherein said means for matching further comprises a mask for controlling the matching process.

7. The system of claim 1 wherein said semistructured information comprises real estate listings.

8. The system of claim 1 wherein said semistructured information comprises job listings.

9. The system of claim 1 wherein said semistructured information comprises items for purchase or sale.

10. A method for extracting information from a semistructured information source into a listing stack comprising:
    examining said semistructured information to identify patterns of interest;
    examining the patterns of interest to identify attributes that correspond to fields of a relational database schema;
    generating a wrapper based upon the attributes;
    matching at least one extractor to said semistructured information to return a list of potential matches using the wrapper;
    iterating through said list of potential matches;
    retrieving information from a particular match in said list of potential matches; and
    adding a particular match into said listing stack.

11. The method of claim 10 further comprising:
    indicating the start of a group of associated information in said listing stack.

12. The method of claim 10 further comprising:
    indicating the end of a group of associated information in said listing stack.

13. The method of claim 10 further comprising:
    converting information stored in said listing stack to a plurality of rows in a table.

14. The method of claim 10 further comprising:
    returning a string for a URL.

15. The method of claim 10 wherein said matching further comprises:
    controlling the matching process using a mask.

16. The method of claim 10 wherein said semistructured information comprises:
    real estate listings.

17. The method of claim 10 wherein said semistructured information comprises job listings.

18. The method of claim 10 wherein said semistructured information comprises items for purchase or sale.

19. A computer programming product for extracting information from a semistructured information source and storing said information so extracted into a listing stack comprising:
    code for examining said semistructured information to identify patterns of interest;
    code for examining the patterns of interest to identify attributes that correspond to fields of a relational database schema;
    code for generating a wrapper based upon the attributes;
    code for matching at least one extractor to said semistructured information using the wrapper to return a list of potential matches;
    code for iterating through said list of potential matches;
    code for retrieving information from a particular match in said list of potential matches;

code for adding a particular match into said listing stack; and a computer readable storage medium for holding said codes.

20. The computer programming product of claim 19 further comprising:

code for indicating the start of a group of associated information in said listing stack.

21. The computer programming product of claim 20 further comprising:

code for indicating the end of a group of associated information in said listing stack.

22. The computer programming product of claim 19 further comprising:

code for converting information stored in said listing stack to a plurality of rows in a table.

23. The computer programming product of claim 19 further comprising:

code for returning a string for a URL.

24. The computer programming product of claim 19 wherein said code for matching further comprises code for controlling the matching process under a mask.

25. The computer programming product of claim 19 wherein said semistructured information comprises real estate listings.

26. The computer programming product of claim 19 wherein said semistructured information comprises job listings.

27. The computer programming product of claim 19 wherein said semistructured information comprises items for purchase or sale.

28. The system of claim 1 wherein the at least one extractor is a regular expression.

29. The system of claim 10 wherein the at least one extractor is a regular expression.

30. The system of claim 19 wherein the at least one extractor is a regular expression.

* * * * *